(12) United States Patent
Khoshnevisan et al.

(10) Patent No.: US 11,191,083 B2
(45) Date of Patent: Nov. 30, 2021

(54) INTERFERENCE RANDOMIZATION FOR MULTI-TCI STATE TRANSMISSION WITH DISJOINT RESOURCE SETS

(71) Applicant: QUALCOMM Incorporated, San Diego, CA (US)

(72) Inventors: Mostafa Khoshnevisan, San Diego, CA (US); Peter Gaal, San Diego, CA (US); Xiaoxia Zhang, San Diego, CA (US); Jing Sun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 253 days.

(21) Appl. No.: 16/576,361

(22) Filed: Sep. 19, 2019

(65) Prior Publication Data
US 2020/0137762 A1    Apr. 30, 2020

Related U.S. Application Data

(60) Provisional application No. 62/750,955, filed on Oct. 26, 2018.

(51) Int. Cl.
*H04W 72/08*    (2009.01)
*H04W 72/12*    (2009.01)
(Continued)

(52) U.S. Cl.
CPC ......... *H04W 72/082* (2013.01); *H04L 5/0092* (2013.01); *H04W 72/0446* (2013.01); *H04W 72/1226* (2013.01); *H04W 76/11* (2018.02)

(58) Field of Classification Search
CPC ... H04L 5/0001; H04L 5/0035; H04L 5/0041; H04L 5/0092; H04L 5/0094;
(Continued)

(56) References Cited

U.S. PATENT DOCUMENTS

2020/0336181 A1 * 10/2020 Cao ............... H04B 17/336

FOREIGN PATENT DOCUMENTS

WO    WO-2019182429 A1 * 9/2019 ........... H04B 7/0695

OTHER PUBLICATIONS

Huawei et al: "Enhancements on multi-TRP/panel transmission", 3GPP Draft; R1-1810104, 3rd Generation Partnership Project (3GPP), Mobile Competence Centre; 650, Route Des Lucioles; F-06921, Sophia-Antipolis Cedex; France, vol. RAN WG1, No. Chengdu, China; Oct. 8, 2018-Oct. 12, 2018, Sep. 29, 2018 (Sep. 29, 2018), XP051517519, 18 pages, Retrieved from the Internet: URL:http://www.3gpp.org/ftpjtsg%5Fran/WG1%5FRL1/TSGR1%5F94b/Docs/R1%2D1810104%2Ezip. .

(Continued)

*Primary Examiner* — Thomas R Cairns
(74) *Attorney, Agent, or Firm* — Michael J. DeHaemer, Jr.

(57) ABSTRACT

Certain aspects of the present disclosure provide techniques for interference randomization for multiple transmission configuration indicator (multi-TCI) state communications with disjoint resource sets for certain systems, such a new radio (NR). A method for wireless communication by a user equipment (UE) is provided. The method generally includes determining a disjoint resource split of a set of resource blocks (RBs) for a multi-TCI state transmission, the determination based on a pseudo-random sequence. The UE decodes the multi-TCI state transmission based on the determination. A base station (BS) also determines the disjoint resource split based on the pseudo-random sequence and transmit the multi-TCI state transmission to a UE on a subset of the RBs based on the determination.

30 Claims, 14 Drawing Sheets

(51) Int. Cl.
   *H04W 76/11*     (2018.01)
   *H04L 5/00*      (2006.01)
   *H04W 72/04*     (2009.01)

(58) Field of Classification Search
   CPC .. H04L 29/12009; H04W 8/26; H04W 16/14;
           H04W 36/0094; H04W 72/0446; H04W
                 72/082; H04W 72/1226; H04W
               72/1231–1236; H04W 72/1273; H04W
                                            76/11
   See application file for complete search history.

(56) References Cited

OTHER PUBLICATIONS

International Search Report and Written Opinion—PCT/US2019/052080—ISA/EPO—dated Dec. 4, 2019.
Qualcomm Incorporated: "Enhancements on Multi-TRP/Panel Transmission", 3GPP Draft; R1-1811277, Multi-TRP Enhancements, 3rd Generation Partnership Project (3GPP), Mobile Competence Centre; 650, Route Des Lucioles; F-06921, Sophia-Antipolis Cedex; France, vol. RAN WG1, No. Chengdu, China; Oct. 8, 2018-Oct. 12, 2018, Sep. 29, 2018 (Sep. 29, 2018), 12 pages, XP051518680, Retrieved from the Internet: URL:http://www.3gpp.org/ftp/tsg%5Fran/WG1%5FRL1/TSGR1%5F94b/Docs/R1%2D1811277%2Ezip.

* cited by examiner

INTERFERENCE RANDOMIZATION FOR MULTI-TCI STATE TRANSMISSION WITH DISJOINT RESOURCE SETS

CROSS-REFERENCE TCI RELATED APPLICATION(S)

This application claims benefit of and priority to U.S. Provisional Patent Application Ser. No. 62/750,955, filed Oct. 26, 2018, herein incorporated by reference in its entirety as if fully set forth below and for all applicable purposes.

BACKGROUND

Field of the Disclosure

Aspects of the present disclosure relate to wireless communications, and more particularly, to techniques for interference randomization for multiple transmission reception point (multi-TRP) communications with disjoint resource sets for certain systems, such a new radio (NR).

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications in a wireless network.

Certain aspects provide a method for wireless communication by a user equipment (UE). The method generally includes determining a disjoint resource split of a set of resource blocks (RBs) for a multiple transmission configuration indicator (multi-TCI) state transmission, the determination based on a pseudo-random sequence. The method generally includes decoding the multi-TCI state transmission based on the determination.

Certain aspects provide a method for wireless communication by a base station (BS) involved in a multi-TCI state transmission. The method generally includes determining a disjoint resource split of a set of RBs for the multi-TCI state transmission, the determination based on a pseudo-random sequence. The method generally includes transmitting the multi-TCI state transmission to a UE on a subset of the RBs based on the determination.

Certain aspects provide an apparatus for wireless communication. The apparatus generally includes means for determining a disjoint resource split of a set of RBs for a multi-TCI state transmission, the determination based on a pseudo-random sequence. The apparatus generally includes means for decoding the multi-TCI state transmission based on the determination.

Certain aspects provide an apparatus for wireless communication involved in a multi-TCI state transmission. The apparatus generally includes means for determining a disjoint resource split of a set of RBs for the multi-TCI state transmission, the determination based on a pseudo-random sequence. The apparatus generally includes means for transmitting the multi-TCI state transmission to a UE on a subset of the RBs based on the determination.

Certain aspects provide an apparatus for wireless communication. The apparatus generally includes at least one processor coupled with a memory and configured to determine a disjoint resource split of a set of RBs for a multi-TCI state transmission, the determination based on a pseudo-random sequence, and to decode the multi-TCI state transmission based on the determination.

Certain aspects provide an apparatus for wireless communication involved in a multi-TCI state transmission. The apparatus generally includes at least one processor coupled with a memory and configured to determine a disjoint resource split of a set of RBs for the multi-TCI state transmission, the determination based on a pseudo-random sequence. The apparatus generally includes a transmitter configured to transmit the multi-TCI state transmission to a UE on a subset of the RBs based on the determination.

Certain aspects provide a computer readable medium having computer executable code stored thereon for wireless communication. The computer executable code generally includes code for determining a disjoint resource split of a set of RBs for a multi-TCI state transmission, the determination based on a pseudo-random sequence. The computer executable code generally includes code for decoding the multi-TCI state transmission based on the determination.

Certain aspects provide a computer readable medium having computer executable code stored thereon for wireless communication. The computer executable code generally includes code for determining a disjoint resource split of a set of RBs for a multi-TCI state transmission, the determination based on a pseudo-random sequence. The computer executable code generally includes code for transmitting the multi-TCI state transmission to a UE on a subset of the RBs based on the determination.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
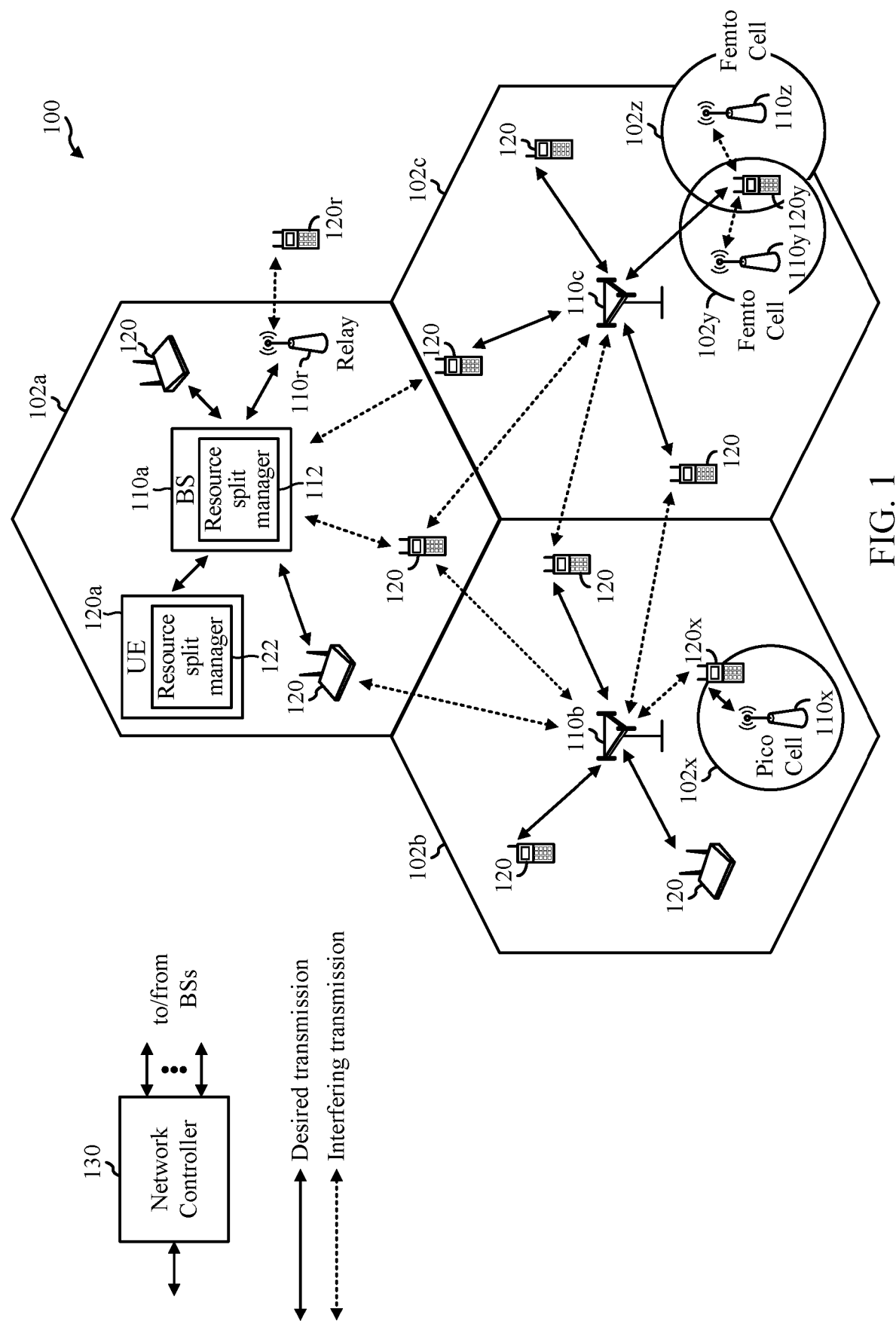
FIG. 1 is a block diagram conceptually illustrating an example telecommunications system, in accordance with certain aspects of the present disclosure.

Aspects of the present disclosure provide apparatus, methods, processing systems, and computer readable mediums for interference randomization for multiple transmission configuration indicator (multi-TCI) state communications with disjoint resource sets for certain systems, such a new radio (NR). A multi-TCI state transmission can be associated with a transmission reception point (TRP), multiple TRPs (e.g., a multi-TRP transmission), and/or multiple quasi-colocation (QCL) parameters In multi-TCI state communications, the resources are split between the TCI states involved in the multi-TCI state transmission. Thus, the TCI states can perform power boosting and still satisfy the per-TCI state (or per TRP) power constraint. In some case, the transmission from one of the TCI states involved in the multi-TCI state transmission to a UE may interfere with a transmission to a different UE (e.g., by a different TCI state or a different TRP).

Aspects of the present disclosure provide techniques for randomizing interference for multi-TCI state transmissions with disjoint resource sets. For example, the resource split for the TCI states in the multi-TCI state can be determined for each time instance based on a pseudo-random sequence.

The following description provides examples of interference randomization for multi-TCI state transmissions with disjoint resource sets, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for the wireless networks and radio technologies mentioned above as well as other wireless networks and radio technologies. In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed. While aspects may be described herein using terminology commonly associated with 3G, 4G, and/or 5G wireless technologies, aspects of the present disclosure can be applied in other generation-based communication systems, such as later technologies.

NR access (e.g., 5G NR technology) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

Certain wireless networks utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth.

NR may utilize OFDM with a cyclic prefix (CP) on the uplink and downlink and include support for half-duplex operation using TDD. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

FIG. 1 illustrates an example wireless communication network 100 in which aspects of the present disclosure may be performed. For example, the wireless communication network 100 may be a NR network. A UE 120 and a BS 110 in the wireless communication network 100 can determine a disjoint resource split of a set of resource blocks (RBs) for a multiple transmission configuration indicator (multi-TCI) state transmission from one or more BSs 110 in the wireless communication network 100. The determination of the resource split is based on a random sequence to randomize interference that could be caused to another UE 120 in the wireless communication network 100 by the multi-TCI state transmission. One or more BSs 110 transmit, and the UE 120 receives and decodes, the multi-TCI state transmission according to the determine resource split.

As illustrated in FIG. 1, the wireless communication network 100 may include a number of BSs 110a-z (each also individually referred to herein as BS 110 or collectively as BSs 110) and other network entities. A BS 110 may provide communication coverage for a particular geographic area, sometimes referred to as a "cell" which may be stationary or may move according to the location of a mobile BS. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells. A network controller 130 may couple to a set of BSs and provide coordination and control for these BSs. The network controller 130 may communicate with the BSs 110 via a backhaul. The BSs 110 may also communicate with one another (e.g., directly or indirectly) via wireless or wireline backhaul. The BSs 110 communicate with UEs 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile.

According to certain aspects, the BSs 110 and UEs 120 may be configured for multi-TCI state communication, such multi-TRP. As shown in FIG. 1, the BS 110a includes a resource split manager 112. The resource split manager 112 may be configured to determine a disjoint resource split of a set of RBs for a multi-TCI state transmission, in accordance with aspects of the present disclosure. The BS 110a may transmit the multi-TCI TCI state transmission to the UE 120a on a subset of the RBs based on the determination. As shown in FIG. 1, the UE 120a includes a resource split manager 122. The resource split manager 122 may be configured to determine a disjoint resource split of a set of RBs for a multi-TCI state transmission, in accordance with aspects of the present disclosure. The UE 120a may decode the multi-TCI state transmission based on the determination.

Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), and/or that relays transmissions between UEs to facilitate communication between devices.

In some examples, access to the air interface may be scheduled. A scheduling entity (e.g., a BS 110) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. BSs are not the only entities that may function as a scheduling entity. In some examples, a UE 120 may function as a scheduling entity and may schedule resources for one or more subordinate entities (e.g., one or more other UEs 120), and the other UEs 120 may utilize the resources scheduled by the UE 120 for wireless communication. In some examples, a UE 120 may function as a scheduling entity in a peer-to-peer (P2P) network, and/or in a mesh network. In a mesh network example, UEs 120 may communicate directly with one another in addition to communicating with a scheduling entity.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

Figure 2:
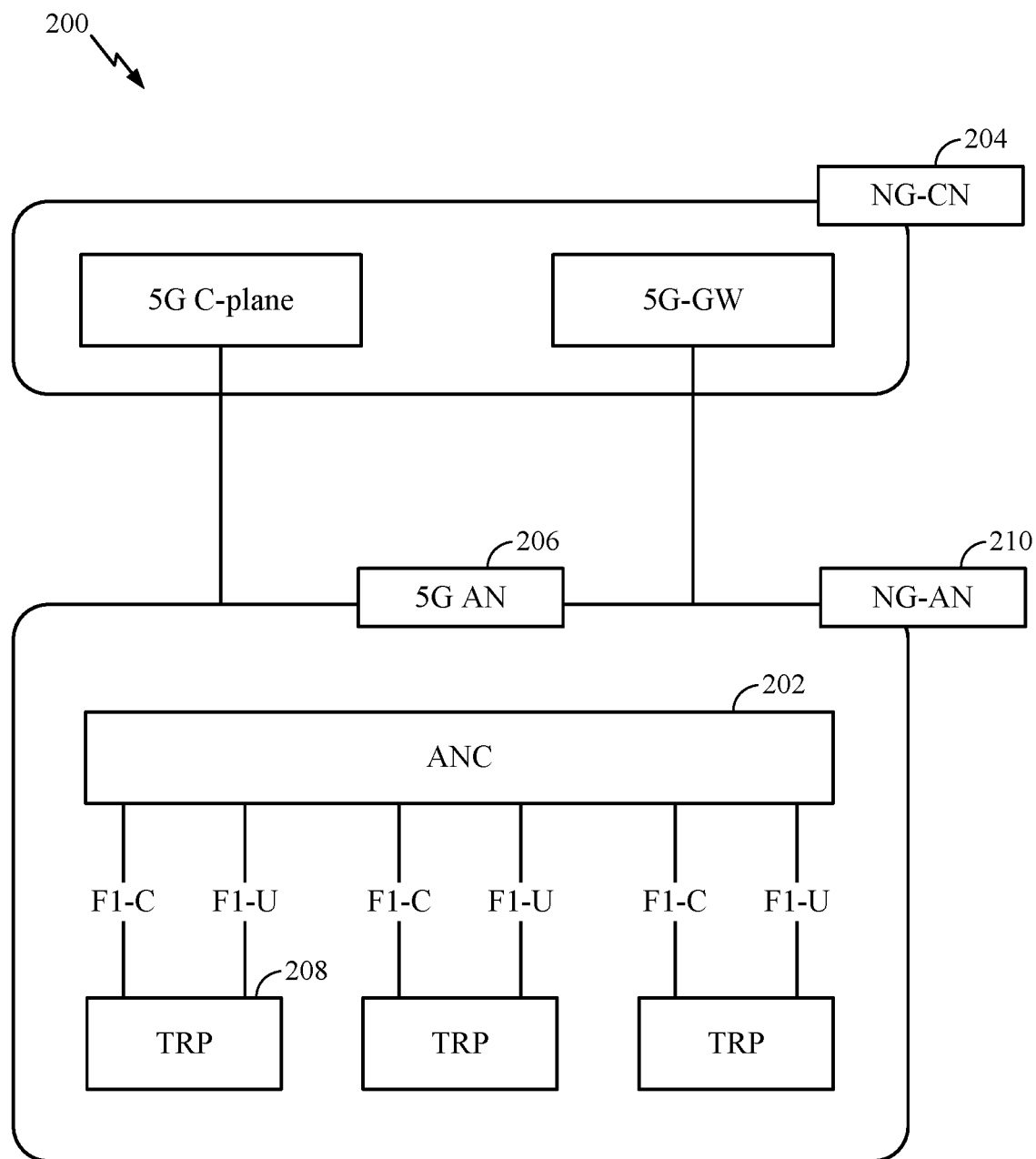
FIG. 2 is a block diagram illustrating an example logical architecture of a distributed radio access network (RAN), in accordance with certain aspects of the present disclosure.

FIG. 2 illustrates an example logical architecture of a distributed Radio Access Network (RAN) 200, which may be implemented in the wireless communication network 100 illustrated in FIG. 1. A 5G access node 206 may include an access node controller (ANC) 202. ANC 202 may be a central unit (CU) of the distributed RAN 200. The backhaul interface to the Next Generation Core Network (NG-CN) 204 may terminate at ANC 202. The backhaul interface to neighboring next generation access Nodes (NG-ANs) 210 may terminate at ANC 202. ANC 202 may include one or more TRPs 208 (e.g., cells, BSs, gNBs, etc.).

The TRPs 208 may be a distributed unit (DU). TRPs 208 may be connected to a single ANC (e.g., ANC 202) or more than one ANC (not illustrated). For example, for RAN sharing, radio as a service (RaaS), and service specific AND deployments, TRPs 208 may be connected to more than one ANC. TRPs 208 may each include one or more antenna ports. TRPs 208 may be configured to individually (e.g., dynamic selection) or jointly (e.g., joint transmission) serve traffic to a UE.

The logical architecture of distributed RAN 200 may support fronthauling solutions across different deployment types. For example, the logical architecture may be based on transmit network capabilities (e.g., bandwidth, latency, and/or jitter).

The logical architecture of distributed RAN 200 may share features and/or components with LTE. For example, next generation access node (NG-AN) 210 may support dual connectivity with NR and may share a common fronthaul for LTE and NR.

The logical architecture of distributed RAN 200 may enable cooperation between and among TRPs 208, for example, within a TRP and/or across TRPs via ANC 202. An inter-TRP interface may not be used.

Logical functions may be dynamically distributed in the logical architecture of distributed RAN 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU (e.g., TRP 208) or CU (e.g., ANC 202).

Figure 3:
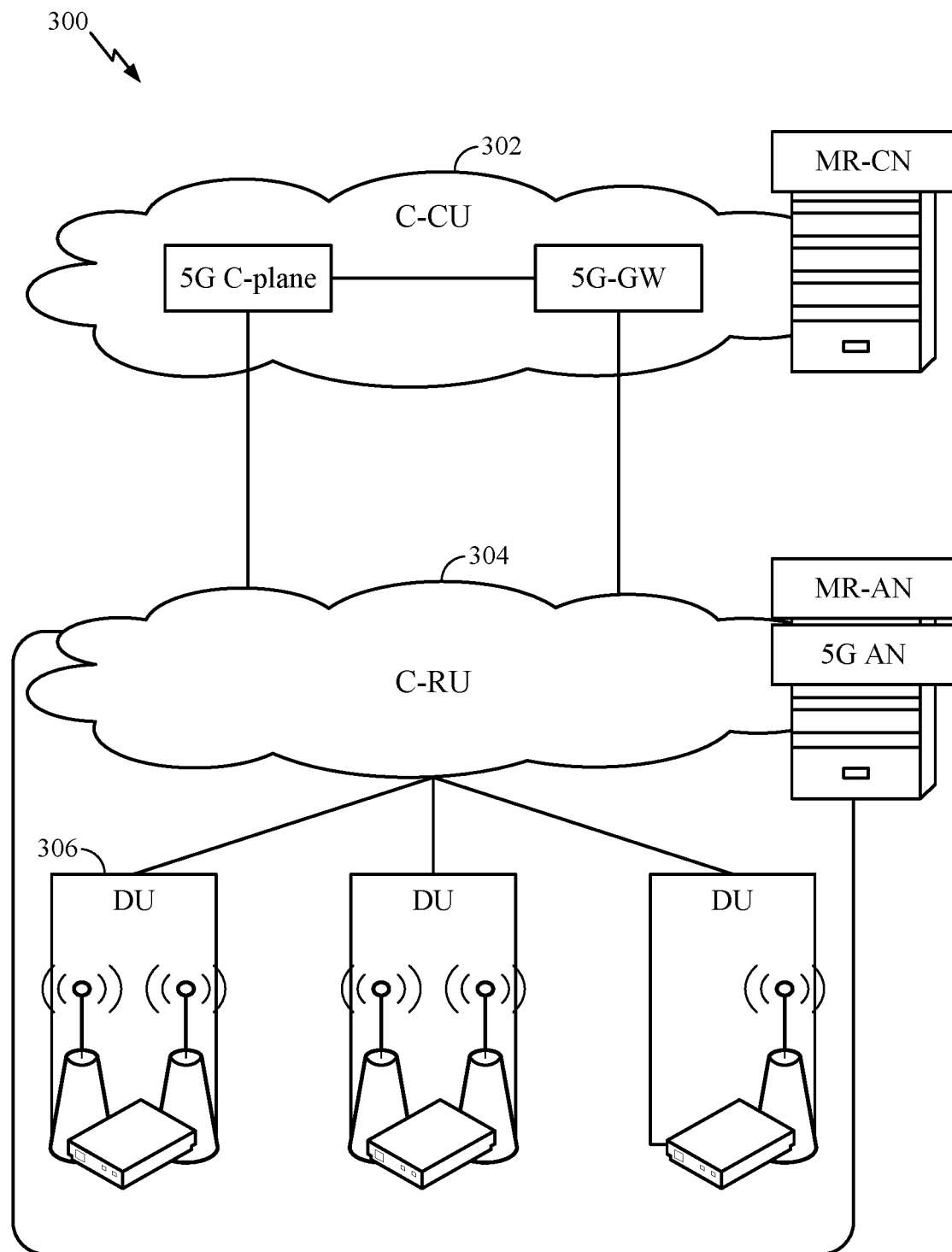
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. C-CU 302 may be centrally deployed. C-CU 302 functionality may be offloaded (e.g., to advanced wireless services (AWS)), in an effort to handle peak capacity.

A centralized RAN unit (C-RU) 304 may host one or more ANC functions. Optionally, the C-RU 304 may host core network functions locally. The C-RU 304 may have distributed deployment. The C-RU 304 may be close to the network edge.

A DU 306 may host one or more TRPs (Edge Node (EN), an Edge Unit (EU), a Radio Head (RH), a Smart Radio Head (SRH), or the like). The DU may be located at edges of the network with radio frequency (RF) functionality.

Figure 4:
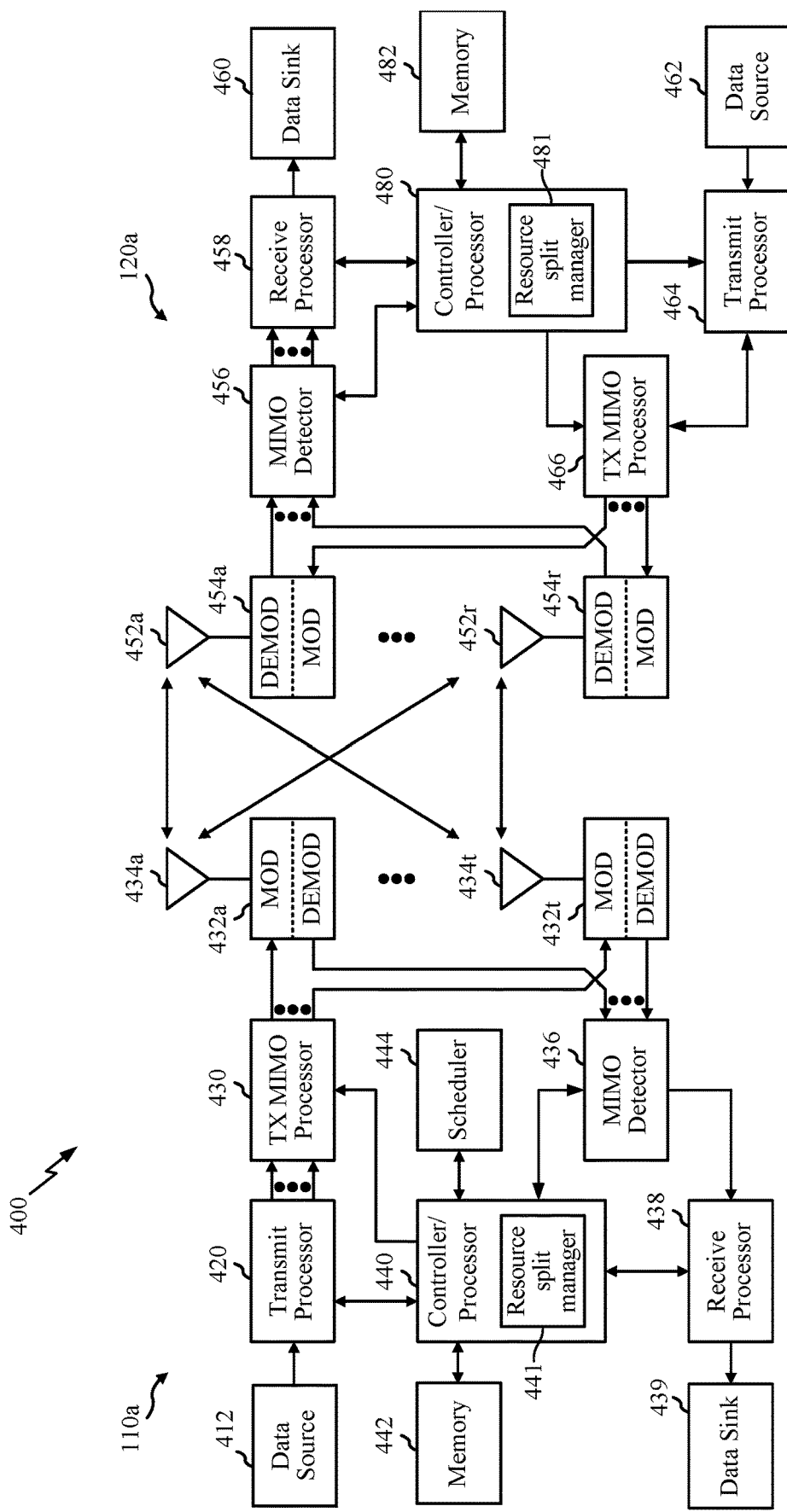
FIG. 4 is a block diagram conceptually illustrating a design of an example base station (BS) and user equipment (UE), in accordance with certain aspects of the present disclosure.

FIG. 4 illustrates example components of BS 110 and UE 120 (as depicted in FIG. 1), which may be used to implement aspects of the present disclosure.

At the BS 110a, a transmit processor 420 may receive data from a data source 412 and control information from a controller/processor 440. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 420 may process (e.g., encode and symbol map) the data and control information to obtain data symbols and control symbols, respectively. The processor 420 may also generate reference symbols, e.g., for the primary synchronization signal (PSS), secondary synchronization signal (SSS), and cell-specific reference signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120a, the antennas 452a through 452r may receive the downlink signals from the BS 110a and may provide received signals to the demodulators (DEMODs) in transceivers 454a through 454r, respectively. Each demodulator 454 may condition (e.g., filter, amplify, downconvert, and digitize) a respective received signal to obtain input samples. Each demodulator may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120a to a data sink 460, and provide decoded control information to a controller/processor 480.

On the uplink, at UE 120a, a transmit processor 464 may receive and process data (e.g., for the physical uplink shared channel (PUSCH)) from a data source 462 and control information (e.g., for the physical uplink control channel (PUCCH) from the controller/processor 480. The transmit processor 464 may also generate reference symbols for a reference signal (e.g., for the sounding reference signal (SRS)). The symbols from the transmit processor 464 may be precoded by a TX MIMO processor 466 if applicable, further processed by the demodulators in transceivers 454a through 454r (e.g., for SC-FDM, etc.), and transmitted to the BS 110a. At the BS 110a, the uplink signals from the UE 120a may be received by the antennas 434, processed by the modulators 432, detected by a MIMO detector 436 if applicable, and further processed by a receive processor 438 to obtain decoded data and control information sent by the UE 120a. The receive processor 438 may provide the decoded data to a data sink 439 and the decoded control information to the controller/processor 440.

The antennas 452, processors 466, 458, 464, and/or controller/processor 480 of the UE 120a and/or antennas 434, processors 420, 430, 438, and/or controller/processor 440 of the BS 110a may be used to perform the various techniques and methods described herein for interference randomization for multi-TCI transmission with disjoint resource sets. As shown in FIG. 4, the controller/processor 440 of the BS 110a has a resource split manager 441. The resource split manager 441 may be configured to determine a disjoint resource split of a set of RBs for a multi-TCI state transmission, in accordance with aspects of the present disclosure. As shown in FIG. 4, the controller/processor 480 of the UE 120a has a resource split manager 481. The resource split manager 481 may be configured to determine a disjoint resource split of a set of RBs for a multi-TCI state transmission, in accordance with aspects of the present disclosure. The memories 442 and 482 may store data and program codes for BS 110a and UE 120a, respectively. A scheduler 444 may schedule UEs for data transmission on the downlink and/or uplink.

Figure 5:
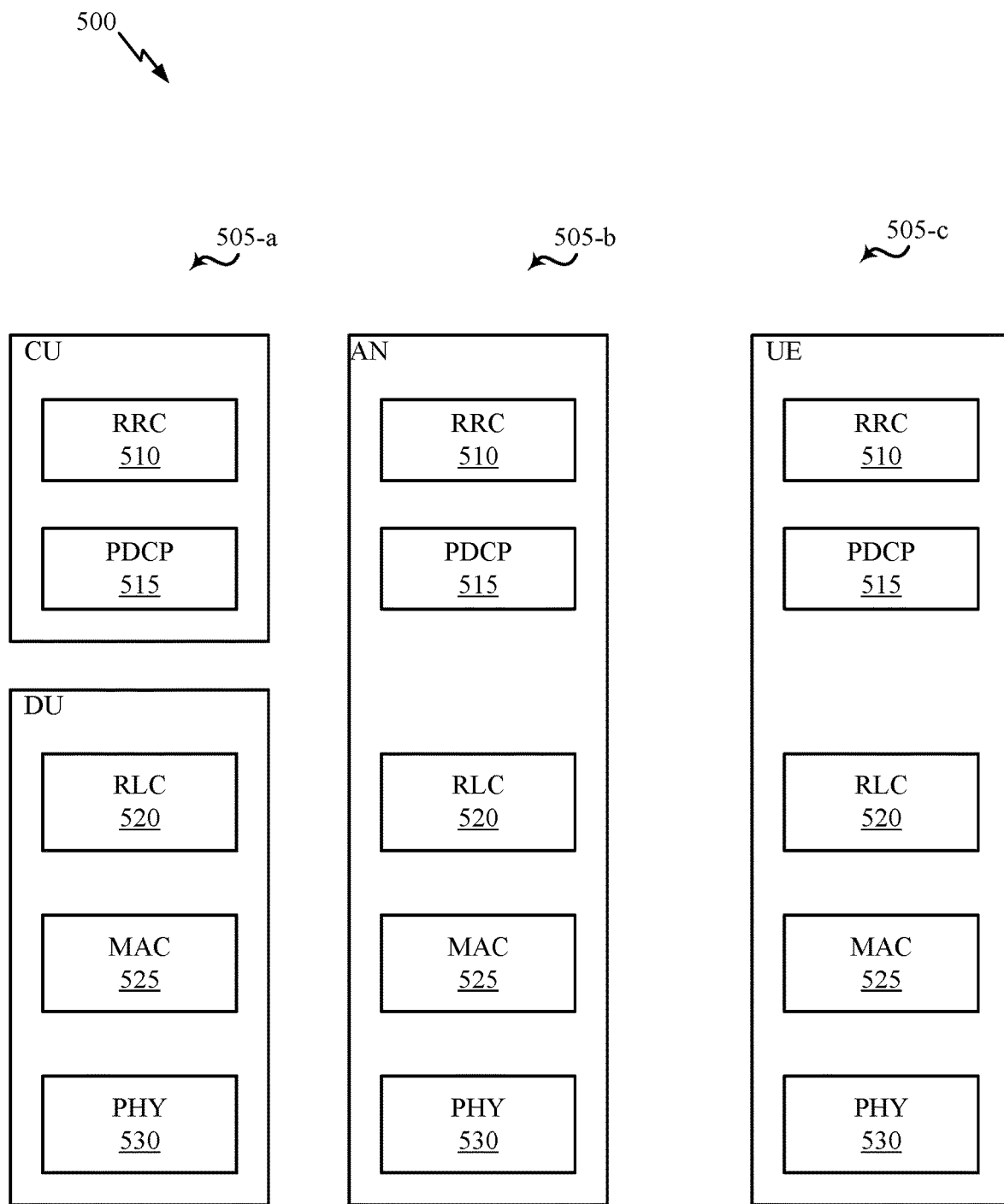
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a wireless communication system, such as a 5G system (e.g., a system that supports uplink-based mobility). Diagram 500 illustrates a communications protocol stack including a RRC layer 510, a PDCP layer 515, a RLC layer 520, a MAC layer 525, and a PHY layer 530. In various examples, the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., DU 208 in FIG. 2). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device. In the second option, RRC layer 510, PDCP layer 515, RLC layer 520, MAC layer 525, and PHY layer 530 may each be implemented by the AN. The second option 505-b may be useful in, for example, a femto cell deployment.

Regardless of whether a network access device implements part or all of a protocol stack, a UE may implement an entire protocol stack as shown in 505-c (e.g., the RRC layer 510, the PDCP layer 515, the RLC layer 520, the MAC layer 525, and the PHY layer 530).

In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing.

Figure 6:
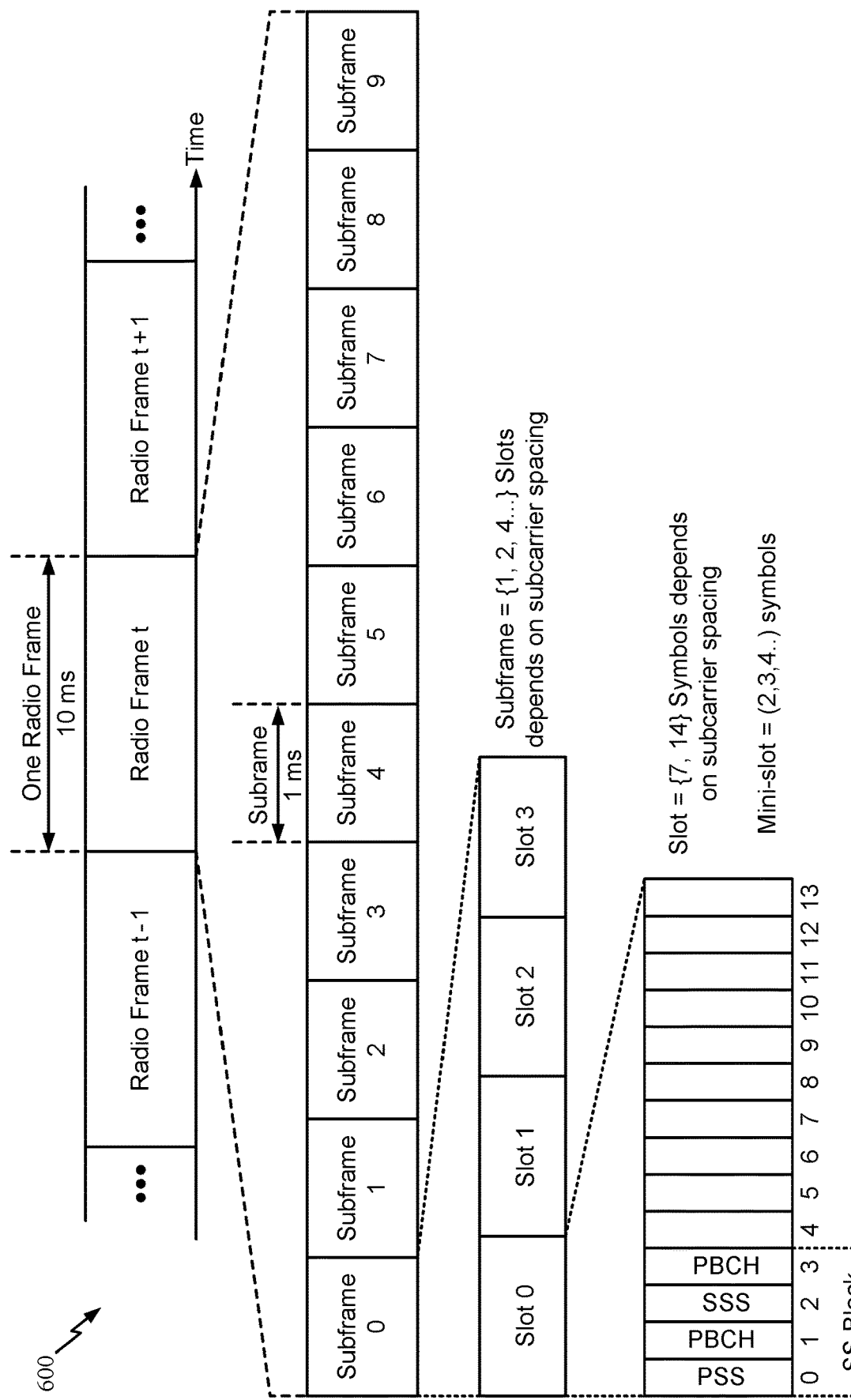
FIG. 6 illustrates an example of a frame format for a new radio (NR) system, in accordance with certain aspects of the present disclosure.

FIG. 6 is a diagram showing an example of a frame format 600 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot, which may be referred to as a sub-slot structure, refers to a transmit time interval having a duration less than a slot (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block is transmitted. The SS block includes a PSS, a SSS, and a two symbol PBCH. The SS block can be transmitted in a fixed slot location, such as the symbols 0-3 as shown in FIG. 6. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SS blocks may be organized into SS bursts to support beam sweeping. Further system information such as, remaining minimum system information (RMSI), system information blocks (SIBs), other system information (OSI) can be transmitted on a physical downlink shared channel (PDSCH) in certain subframes. The SS block can be transmitted up to sixty-four times, for example, with up to sixty-four different beam directions for mmW. The up to sixty-four transmissions of the SS block are referred to as the SS burst set. SS blocks in an SS burst set are transmitted in the same frequency region, while SS blocks in different SS bursts sets can be transmitted at different frequency locations.

Certain systems, such as NR systems, support multi-TCI state communication. In a multi-TCI state scenario, the same transport block (TB) (e.g., same information bits but can be the same or different coded bits) is transmitted from multiple TCI states, such as by multiple transmission reception points (TRPs), multiple antenna panels, and/or multiple quasi-colocation sets. The UE considers the transmissions from the TCI states and jointly decodes the transmissions. In some examples, the transmissions from the TCI states is at the same time (e.g., in the same slot, mini-slot, and/or in the same symbols), but across different resource blocks (RBs) and/or different layers. In some examples, the transmissions from the TCI states can be at different times (e.g., in two consecutive mini-slots or slots). In some examples, the transmissions from the TCI states can be a combination of the above.

Figure 7:
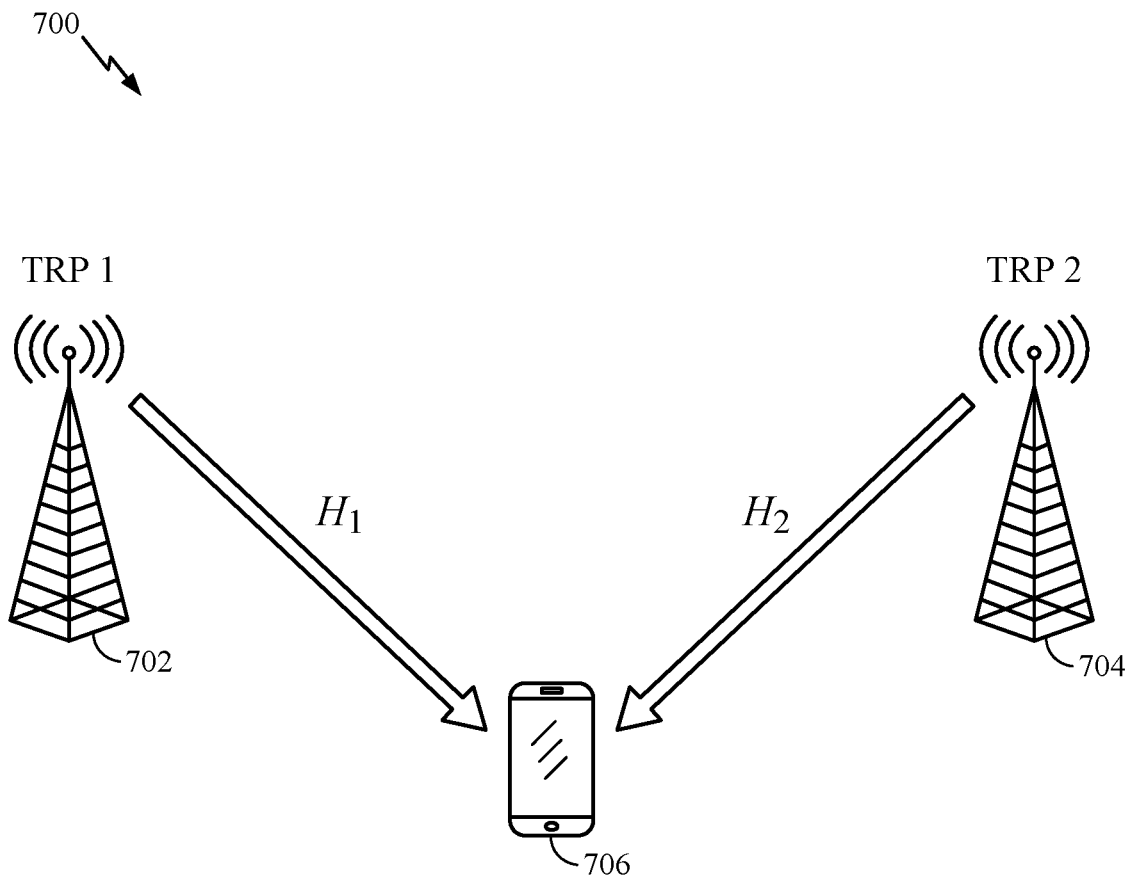
FIG. 7 is a diagram illustrating an example multiple transmission reception point (multi-TRP) scenario, in accordance with certain aspects of the present disclosure.

FIG. 7 is a diagram illustrating an example multi-TRP transmission scenario 700, in accordance with certain aspects of the present disclosure. As shown in FIG. 7, the UE 706 receives a same packet (e.g., a TB or CB) from both TRP 702 (TRP 1) and TRP 704 (TRP 2) at the same time. In some examples, the TRPs 702 and 704 transmit using disjoint resource sets. For example, TRP 702 transmits with a resource set 1 and TRP 704 transmits with a resource set 2.

Figure 8A:
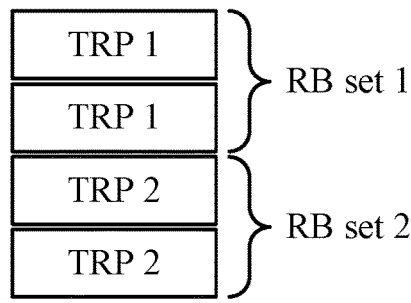
FIGS. 8A-8D illustrate example disjoint resource sets for multiple transmission configuration indicator (TCI) states, in accordance with certain aspects of the present disclosure.
Figure 8B:
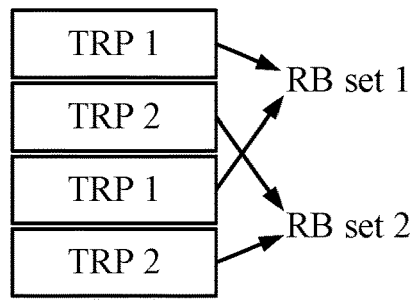
Figure 8C:
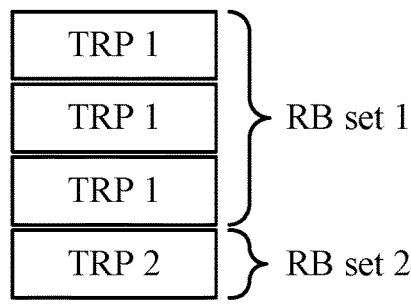
Figure 8D:
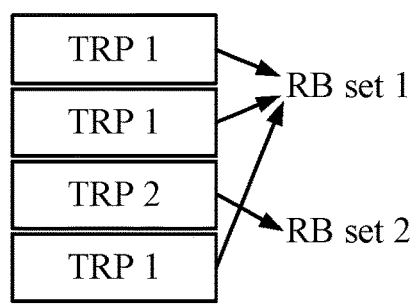

FIGS. 8A-8D illustrate example disjoint resource sets for TRPs, in accordance with certain aspects of the present disclosure. The disjoint resources for the TRPs may be localized (e.g., contiguous) or distributed (e.g., interleaved). FIG. 8A and FIG. 8C illustrate localized resources and FIGS. 8B and FIG. 8D illustrate distributed resources. The disjoint resources for the TRPs may have an equal split (i.e., same number of RBs) or an unequal split (i.e., different numbers of RBs). FIG. 8A and FIG. 8B illustrate an equal split of resources and FIGS. 8C and FIG. 8D illustrate an unequal split of resources. Each unit may be one RB, a resource block group (RBG), or a PRG (precoding RBG, a group of RBs with the same precoding, i.e., one channel estimation unit). Although FIGS. 8A-8D illustrate resource sets for two TRPs, the resource sets for a multi-TCI state transmission could be for more than two TRPs and could be for multiple TCI states at one or multiple base station (BSs).

Multi-TCI state transmission may cause interference to other devices. In some cases, a TCI state involved in a multi-TCI state may transmit in its set of resources and mute in the other resources. Therefore, the TCI state may use power boosting for its transmission and still satisfy the per-TCI state (e.g., a per-TRP) power constraint. In some examples, if the TCI state transmits on half of the RBs, the TCI state may boost its power by 3 dB. This can create additional interference to another UE scheduled on the same resources by another TCI state. In some examples, the transmissions by the TCI states involved in the multi-TCI state transmission and the other TCI state are not perfectly coordinated and, therefore, the TCI states use the same RBs.

Figure 9:
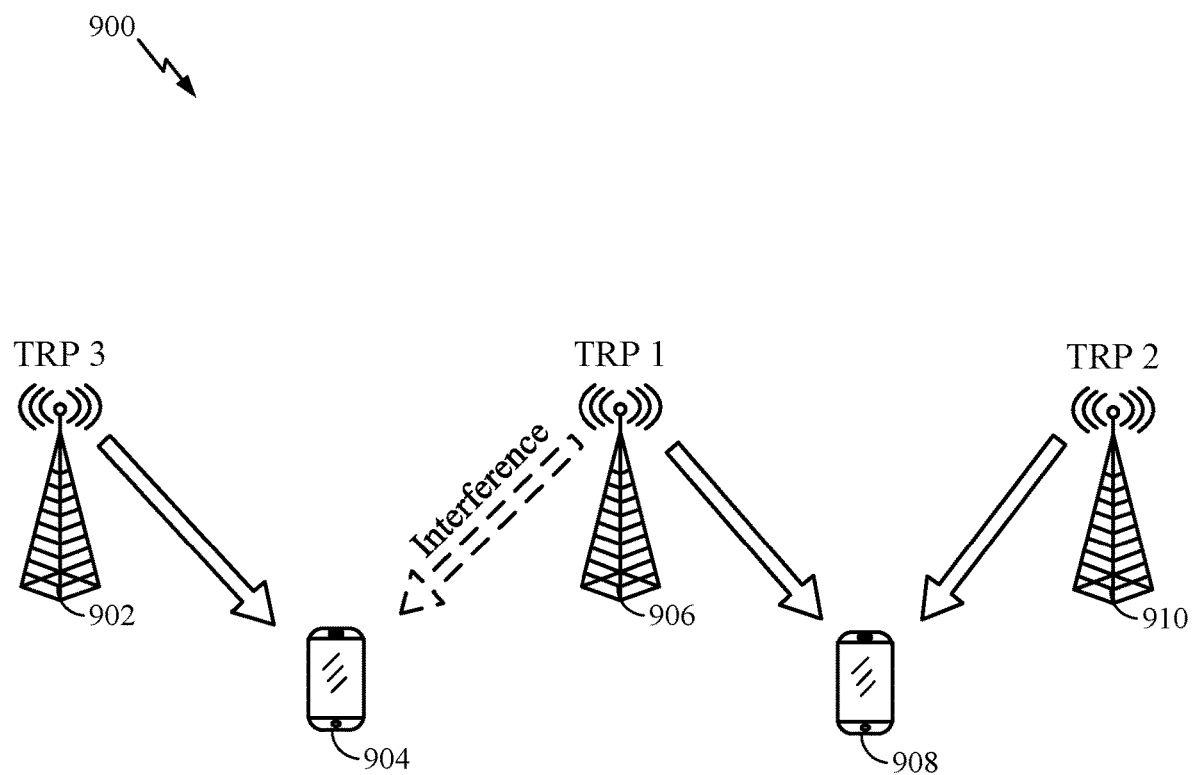
FIG. 9 is a diagram illustrating an example multi-TRP scenario causing interference to a UE.

FIG. 9 is a diagram illustrating an example multi-TRP scenario 900 causing interference to a UE. As shown in FIG. 9, the TRP 906 (TRP 1) and the TRP 910 (TRP 2) are involved in a multi-TRP transmission to the UE 908 (UE 1). The TRP 906 and TRP 910 may have a resource split, for example, one of the resource splits shown in FIGS. 8A-8D. In an example, the TRP 906 may use the RB set 1. The TRP 906 may use power boosting, for example by 3 dB, on the RB set 1. As shown in FIG. 9, the TRP 902 (TRP 3) transmits to the UE 904 (UE 2) and also uses the RB set 1. Thus, the transmission by the TRP 906 to the UE 908 interferes with the transmission by the TRP 902 to the UE 904.

Figure 10:
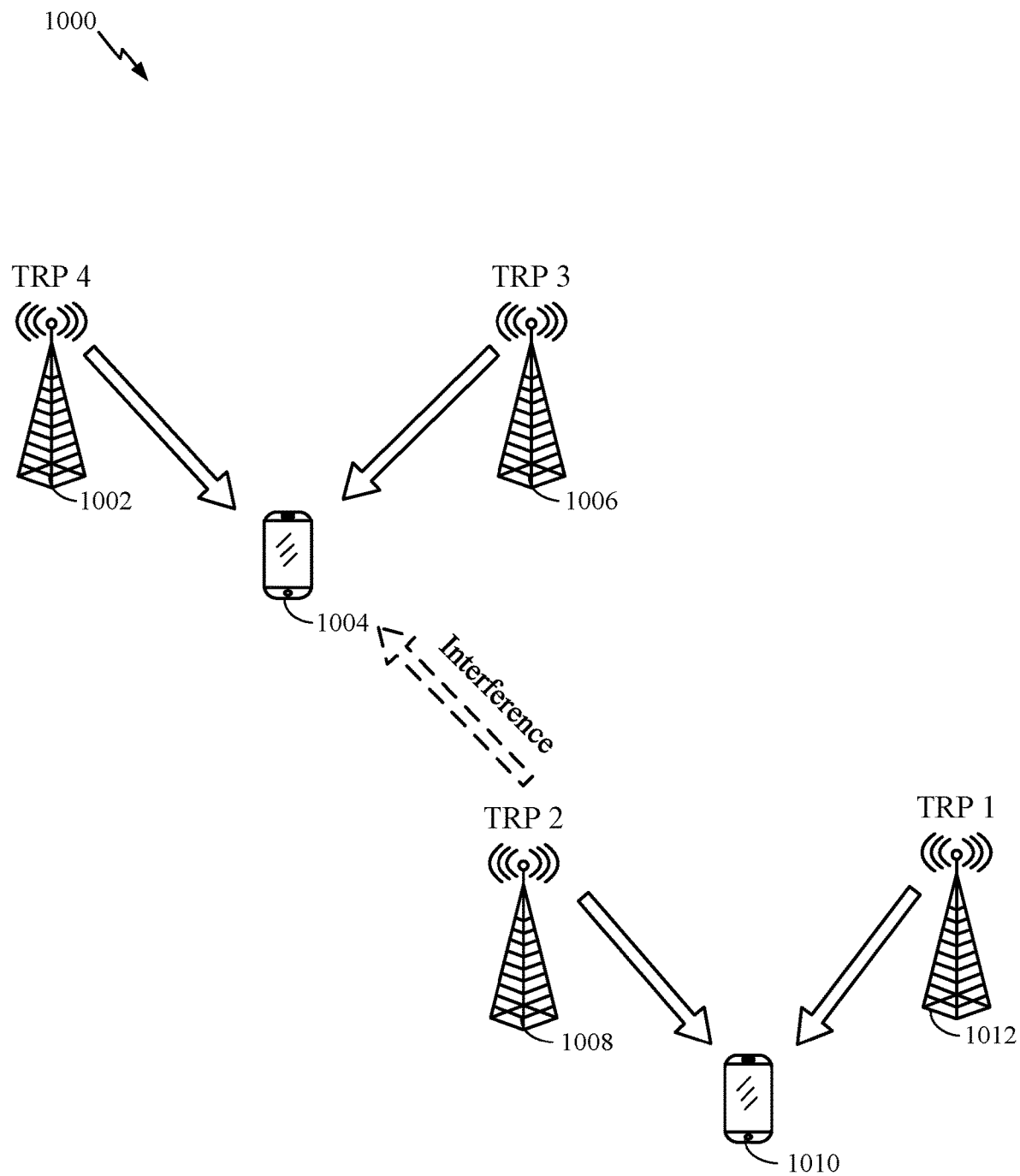
FIG. 10 is a diagram illustrating another example multi-TRP scenario causing interference to a UE.

FIG. 10 is a diagram illustrating another example multi-TRP scenario 1000 causing interference to a UE. As shown in FIG. 10, TRP 1012 (TRP 1) and TRP 1008 (TRP 2) are involved in a multi-TRP transmission to the UE 1010 (UE 1), and the TRP 1006 (TRP 3) and TRP 1002 (TRP 4) are involved in a multi-TRP transmission to the UE 1004 (UE 2). As shown in FIG. 10, the transmission from the TRP 1008 to the UE 1010 may interfere with the transmission from the TRP 1006 to the UE 1004. For example, the TRP 1008 and the TRP 1006 may transmit using the same RBs.

Therefore, what is needed are techniques for reducing the impact of interference by multi-TCI state transmissions.

Example Interference Randomization for Multi-TCI State Transmission with Disjoint Resource Sets Aspects of the present disclosure provide techniques and apparatus for interference randomization for multiple transmission configuration indicator (multi-TCI) state transmission with disjoint resource sets. The techniques provide for randomization, for example without tight coordination between TCI states, to ensure that strong interference does not persistently hit the data with a pattern. Instead, for multi-TCI state transmission with disjoint resource sets, the choice of resource sets for the TCI states, from a total of assigned resources, is randomized with a pseudo-random sequence. For example, the base station(s) and the user equipment (UE) involved in the multi-TCI state transmission can generate the same pseudo-random number at a given instance based on the same one or more parameters to determine the same resource split for the multi-TCI state transmission. The resource split can be different for different UEs, even when their total assigned resources are the same.

Figure 11:
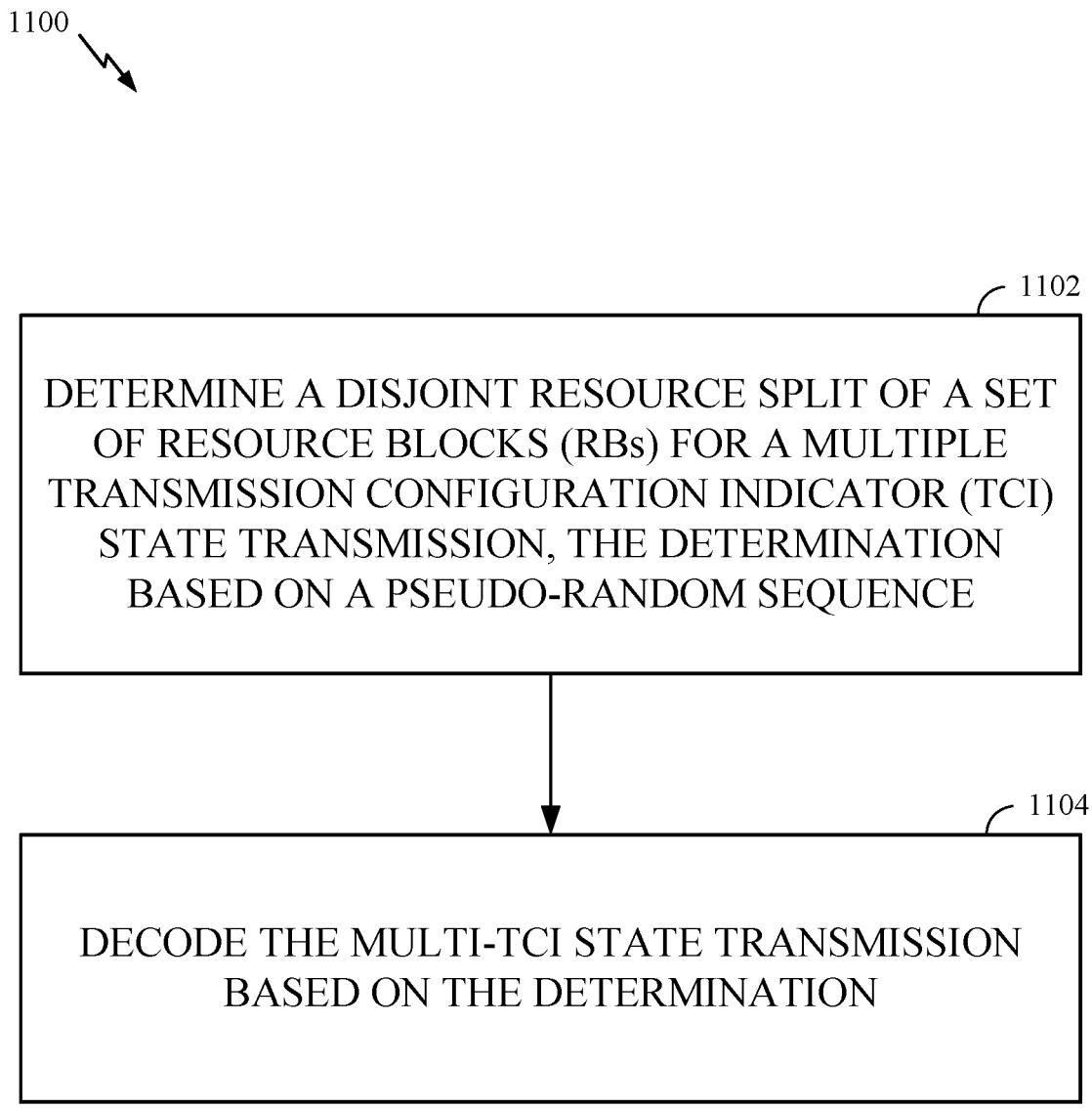
FIG. 11 is a flow diagram illustrating example operations by a UE for wireless communication, in accordance with certain aspects of the present disclosure.

FIG. 11 is a flow diagram illustrating example operations 1100 for wireless communication, in accordance with certain aspects of the present disclosure. The operations 1100 may be performed, for example, by a UE (e.g., such as a UE 120 in the wireless communication network 100). Operations 1100 may be implemented as software components that are executed and run on one or more processors (e.g., controller/processor 480 of FIG. 4). Further, the transmission and reception of signals by the UE in operations 1100 may be enabled, for example, by one or more antennas (e.g., antennas 452 of FIG. 4). In certain aspects, the transmission and/or reception of signals by the UE may be implemented via a bus interface of one or more processors (e.g., controller/processor 480) obtaining and/or outputting signals.

The operations 1100 may begin, at 1102, by determining a disjoint resource split of a set of resource blocks (RBs) for a multi-TCI state transmission. The determination is based on a pseudo-random sequence. The UE may determine the resource split at the RB level, resource block group (RBG) level, or precoding RBG (PRG) level. The resource split may be equal (e.g., same number of RBs for each of the TCI states) or unequal (e.g., different numbers of RBs for the TCI states). The resource sets for the TCI states may include RBs that are contiguous or non-contiguous (e.g., interleaved/distributed). For a multi-TCI state transmission with two TCI states, the UE determines a first subset of the RBs for the first TCI state and a second subset of the RBs for the second TCI state. The UE may determine/re-determine the resource split each transmission instance (e.g., every slot).

According to certain aspects, the UE and the BS(s) involved in the multi-TCI state transmission, each determines the same resource split. For example, the UE and BS(s) each generates the pseudo-random sequence using the same seed, the seed generated using the same parameter. In some examples, the random sequence is based on an identifier of the UE. For example, the parameter used to generate the seed may be a radio network temporary identifier (RNTI) of the UE (e.g., the cell RNTI (C-RNTI), configured scheduling RNTI (CS-RNTI), etc.) or a separate ID of the UE configured by higher layers. In some examples, the parameter used to generate the seed may be an identifier of one or more of the TRPs involved in the multi-TRP transmission, such as the physical cell ID (PCI) or PCIs. In some examples, the parameter used to generate the seed is a slot number or an RB index number, such as the index of the first RB of scheduled RBs in an active bandwidth part (BWP).

According to certain aspects, based on the pseudo-random sequence, the resource split is determined as one combination from a set of total possible combinations of the set of RBs. The total possible combinations are based on the number of RBs in the set, the granularity at which the resource split is determined, the number of TRPs involved in the multi-TCI state transmission, and whether the resource split is equal or unequal. For example, assuming 2N PRGs and an equal split between two TCI states for a multi-TCI state transmission, there are $$\binom{2N}{N}$$

possibilities for the PRG split. The pseudo-random sequence determines which one for a given instance. For a non-equal split, such as a 1:3 split ratio, the total possibilities are $$\binom{2N}{N/2}.$$

The ratio of the split can be deterministic and exact (e.g., known a-priori by BS(s) and UE) or can be non-deterministic/approximate (e.g., not known a-priori, but generated as a result of pseudo-random split generation), for example, for an approximately equal split total, the possibilities can be $$\binom{2N}{N-1}+\binom{2N}{N}+\binom{2N}{N+1},$$

for equal split ±1 PRG.

According to certain aspects, the resource split can be determined from a configured restricted subset of the set of total possible combinations. In some examples, all of the combinations may not be needed to randomize the interference. In some examples, some combinations may not be preferred. For example, in some cases, for more frequency diversity, combinations that are localized or close to localized may be omitted. Thus, the restricted subset may include only combinations of at least partially distributed RBs.

At 1104, the UE decodes the multi-TCI state transmission based on the determination. In some examples, the UE receives the multi-TCI state transmission as receiving the same information bits of a TB (e.g. on the PDSCH), from the TCI states involved in the multi-TCI state transmission in a same duration (e.g., a same slot, mini-slot, or symbol). For example, the UE monitors/receives the multi-TCI state transmission from the first TCI state on the first subset of RBs and from the second TCI state one the second subset of RBs. In some examples, on the first subset of RBs, the first TCI state transmits using power boosting (e.g., up to 3 dB) and the second TCI state is muted; and on the second subset of RBs, the second TCI state transmits using power boosting (e.g., up to 3 dB) and the first TCI state is muted.

Figure 12:
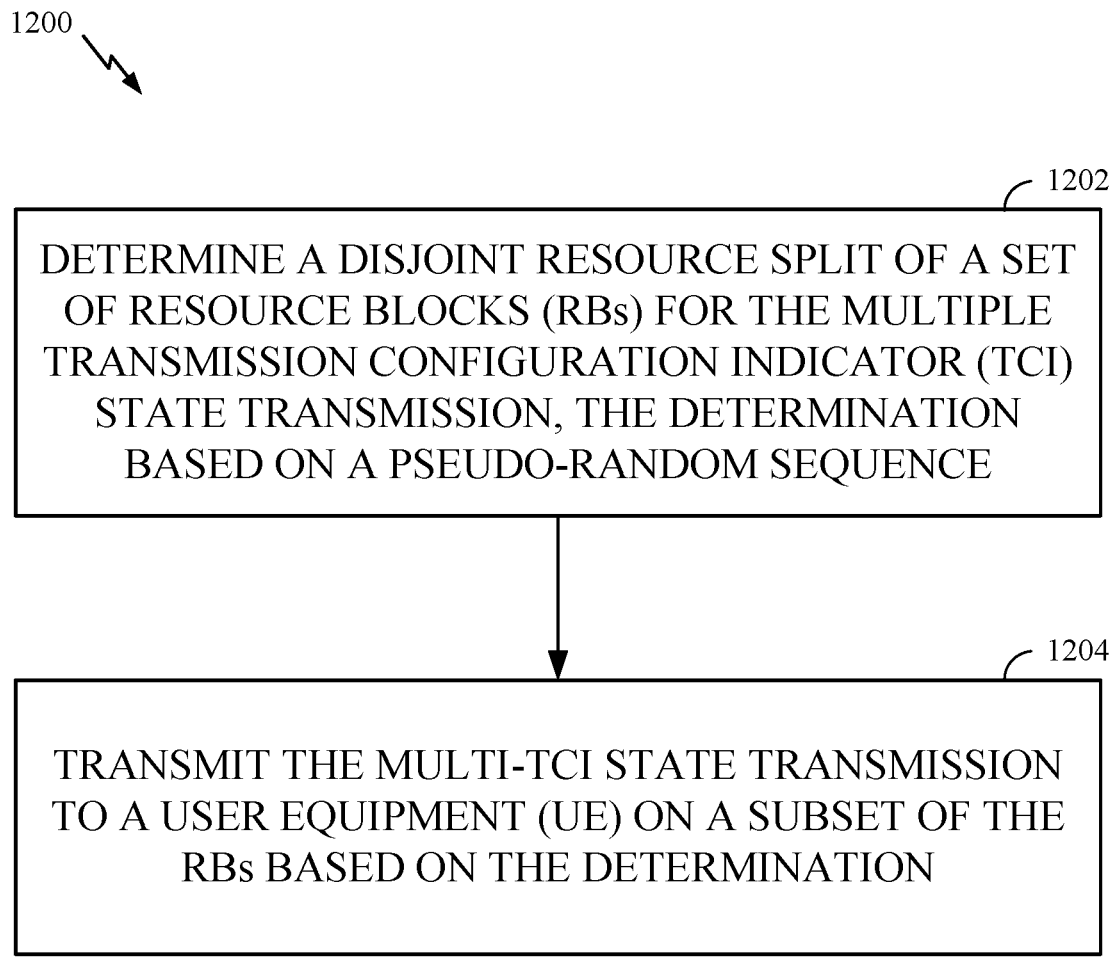
FIG. 12 is a flow diagram illustrating example operations by a BS for wireless communication, in accordance with certain aspects of the present disclosure.

FIG. 12 is a flow diagram illustrating example operations 1200 for wireless communication, in accordance with certain aspects of the present disclosure. The operations 1200 may be performed, for example, by a BS (e.g., such as a BS 110 in the wireless communication network 100), involved in a multi-TCI state transmission. The operations 1200 may be complimentary operations by the BS to the operations 1100 performed by the UE. Operations 1200 may be implemented as software components that are executed and run on one or more processors (e.g., controller/processor 440 of FIG. 4). Further, the transmission and reception of signals by the BS in operations 1200 may be enabled, for example, by one or more antennas (e.g., antennas 434 of FIG. 4). In certain aspects, the transmission and/or reception of signals by the BS may be implemented via a bus interface of one or more processors (e.g., controller/processor 440) obtaining and/or outputting signals.

The operations 1200 may begin, at 1202, by determining a disjoint resource split of a set of RBs for the multi-TCI state transmission. The determination is based on a pseudo-random sequence. As discussed above, the UE and BS determine the same resource split by using a pseudo-random sequence based on a same seed generated using a same parameter. As discussed above, the BS may determine/re-determine the resource split for each transmission instance (e.g., each slot).

At 1204, the BS transmits the multi-TCI state transmission to a UE on a subset of the RBs based on the determination. For example, the BS transmits the same information bits of a TB (e.g., on the PDSCH) with TCI state as the other TCI states involved in the multi-TCI state transmission. The transmissions may be in the same slot or symbol. The TCI state may transmit using power boosting (e.g., up to 3 dB) on its subset of the resources, and may mute on the other resources.

Figure 13:
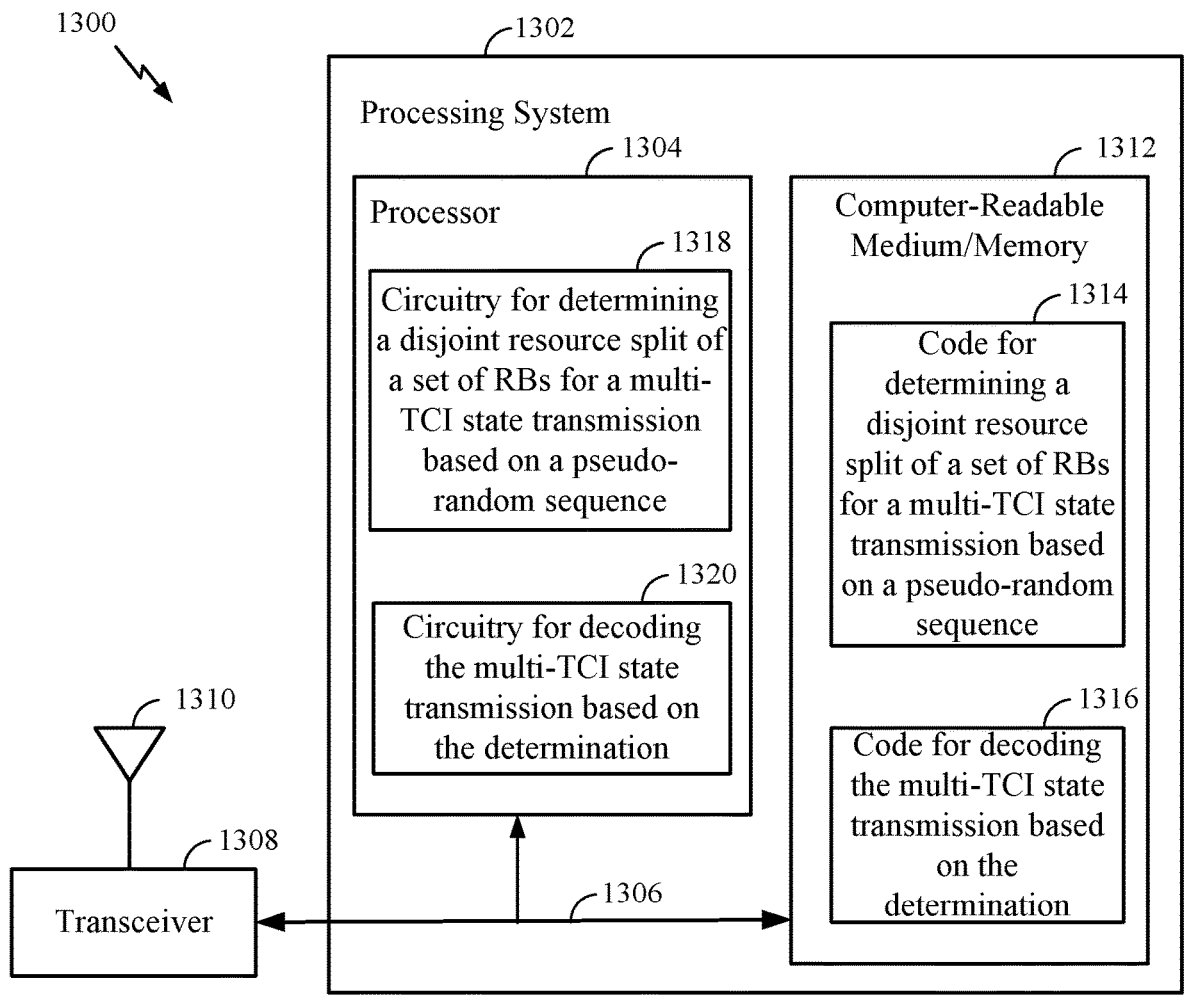
FIG. 13 illustrates a communications device that may include various components configured to perform operations for the techniques disclosed herein in accordance with aspects of the present disclosure.

FIG. 13 illustrates a communications device 1300 that may include various components (e.g., corresponding to means-plus-function components) configured to perform operations for the techniques disclosed herein, such as the operations illustrated in FIG. 11. The communications device 1300 includes a processing system 1302 coupled to a transceiver 1308. The transceiver 1308 is configured to transmit and receive signals for the communications device 1300 via an antenna 1310, such as the various signals as described herein. The processing system 1302 may be configured to perform processing functions for the communications device 1300, including processing signals received and/or to be transmitted by the communications device 1300.

The processing system 1302 includes a processor 1304 coupled to a computer-readable medium/memory 1312 via a bus 1306. In certain aspects, the computer-readable medium/memory 1312 is configured to store instructions (e.g., computer-executable code) that when executed by the processor 1304, cause the processor 1304 to perform the operations illustrated in FIG. 11, or other operations for performing the various techniques discussed herein for interference randomization for multi-TRP with disjoint resource sets. In certain aspects, computer-readable medium/memory 1312 stores code 1314 for determining a disjoint resource split of a set of RBs for a multi-TCI state transmission based on a pseudo-random sequence and code 1316 for decoding the multi-TCI state transmission based on the determination. In certain aspects, the processor 1304 has circuitry configured to implement the code stored in the computer-readable medium/memory 1312. The processor 1304 includes circuitry 1318 for determining a disjoint resource split of a set of RBs for a multi-TCI state transmission based on a pseudo-random sequence and circuitry 1320 for decoding the multi-TCI state transmission based on the determination.

Figure 14:
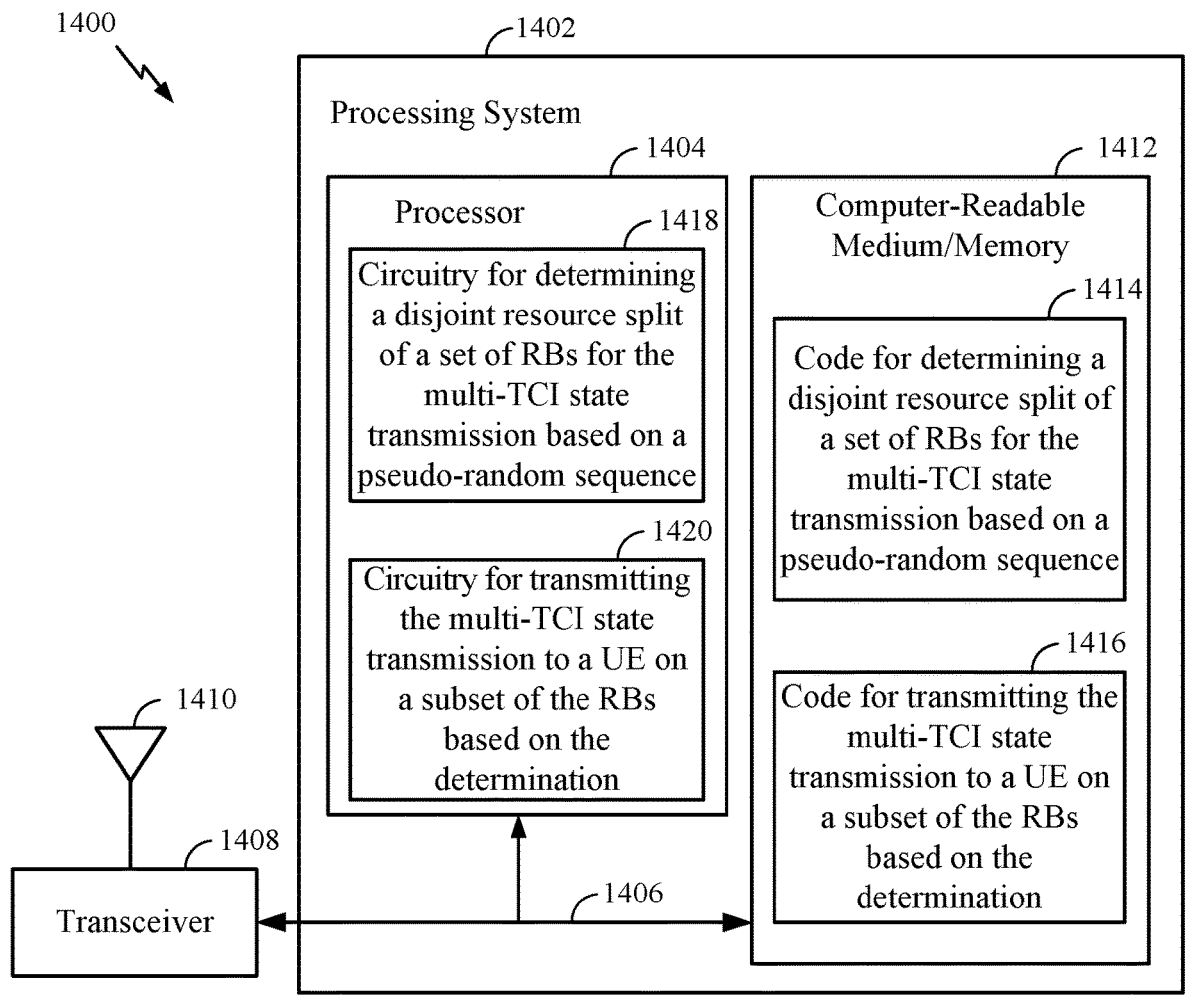
FIG. 14 illustrates a communications device that may include various components configured to perform operations for the techniques disclosed herein in accordance with aspects of the present disclosure.

FIG. 14 illustrates a communications device 1400 that may include various components (e.g., corresponding to means-plus-function components) configured to perform operations for the techniques disclosed herein, such as the operations illustrated in FIG. 12. The communications device 1400 includes a processing system 1402 coupled to a transceiver 1408. The transceiver 1408 is configured to transmit and receive signals for the communications device 1400 via an antenna 1410, such as the various signals as described herein. The processing system 1402 may be configured to perform processing functions for the communications device 1400, including processing signals received and/or to be transmitted by the communications device 1400.

The processing system 1402 includes a processor 1404 coupled to a computer-readable medium/memory 1412 via a bus 1406. In certain aspects, the computer-readable medium/memory 1412 is configured to store instructions (e.g., computer-executable code) that when executed by the processor 1404, cause the processor 1404 to perform the operations illustrated in FIG. 12, or other operations for performing the various techniques discussed herein for interference randomization for multi-TRP with disjoint resource sets. In certain aspects, computer-readable medium/memory 1412 stores code 1414 for determining a disjoint resource split of a set of RBs for a multi-TCI state transmission based on a pseudo-random sequence and code 1416 for transmitting the multi-TCI state transmission on a subset of RBs based on the determination. In certain aspects, the processor 1404 has circuitry configured to implement the code stored in the computer-readable medium/memory 1412. The processor 1404 includes circuitry 1418 for determining a disjoint resource split of a set of RBs for a multi-TCI state transmission based on a pseudo-random sequence and circuitry 1420 for transmitting the multi-TCI state transmission on a subset of RBs based on the determination.

Example Aspects

In a first aspect, a method for wireless communications by a user equipment (UE) comprises determining a disjoint resource split of a set of resource blocks (RBs) for a multiple transmission configuration indicator (multi-TCI) state transmission, the determination based on a pseudo-random sequence; and decoding the multi-TCI state transmission based on the determination.

In a second aspect, alone or in combination with the first aspect, decoding the multi-TCI state transmission comprises receiving the same information bits of a transport block (TB), on a physical downlink shared channel (PDSCH), from the multiple TCI states in a same slot or a same symbol.

In a third aspect, alone or in combination with one or more of the first or second aspects, the resource split is determined at the RB level, RB group (RBG) level, or precoding RBG (PRG) level; the resource split is equal having the same number of RBs for each of the TCI states or unequal having different numbers of RBs for the TCI states; and the RBs for each of the TCI states are contiguous or non-contiguous.

In a fourth aspect, alone or in combination with one or more of the first through third aspects, the determination includes determining a first subset of the RBs for a first TCI state involved in the multi-TCI state transmission and a second subset of the RBs for a second TCI state involved in the multi-TCI state transmission.

In a fifth aspect, alone or in combination with one or more of the first through fourth aspects, on the first subset of RBs, the multi-TCI state transmission is received with power boosting by the first TCI state and the second TCI state is muted; and on the second subset of RBs, the multi-TCI state transmission is received with power boosting by the second TCI state and the first TCI state is muted.

In a sixth aspect, alone or in combination with one or more of the first through fifth aspects, the determination of the resource split is performed per-slot.

In a seventh aspect, alone or in combination with one or more of the first through sixth aspects, the method further comprises generating the pseudo-random sequence using a same seed generated based on a same parameter as the seed and parameter used by the multiple TCI states to determine the same resource split.

In an eighth aspect, alone or in combination with one or more of the first through seventh aspects, the pseudo-random sequence is based on an identifier of the UE.

In a ninth aspect, alone or in combination with one or more of the first through eighth aspects, the identifier of the UE comprises a radio network temporary identifier (RNTI) of the UE or a separate ID of the UE configured by higher layers.

In a tenth aspect, alone or in combination with one or more of the first through ninth aspects, the pseudo-random sequence is based on an identifier of one or more of the TCI states involved in the multi-TCI state transmission.

In a eleventh aspect, alone or in combination with one or more of the first through tenth aspects, the identifier is a physical cell identifier (PCI) of the one or more TCI states.

In a twelfth aspect, alone or in combination with one or more of the first through eleventh aspects, the pseudo-random sequence is based on a slot number or an RB index number.

In a thirteenth aspect, alone or in combination with one or more of the first through twelfth aspects, the RB index number is the index of the first RB of scheduled RBs in an active bandwidth part (BWP).

In a fourteenth aspect, alone or in combination with one or more of the first through thirteenth aspects, the determination of the resource split based on the pseudo-random sequence comprises determining one combination from a set of total possible combinations of the set of RBs between the multiple TCI states, and the number of possible combinations is based on the number of RBs in the set, the granularity at which the resource split is determined, the number of TCI states involved in the multi-TCI state transmission, and whether the resource split is equal or unequal.

In a fifteenth aspect, alone or in combination with one or more of the first through fourteenth aspects, determining the resource split based on the pseudo-random sequence comprises determining one combination from a configured restricted subset of the set of total possible combinations.

In a sixteenth aspect, alone or in combination with one or more of the first through fifteenth aspects, the restricted subset includes only combinations of at least semi-distributed RBs.

In a seventeenth aspect, alone or in combination with one or more of the first through sixteenth aspects, the determination of the ratio of resources for the resource split is deterministic or non-deterministic.

In an eighteenth aspect, alone or in combination with one or more of the first through seventeenth aspects, the multiple TCI states are associated with different transmission reception points (TRPs), different antenna panels of a TRP, different quasi co-colocation parameters, or a combination thereof.

In a nineteenth aspect, a method for wireless communications by a base station (BS) involved in a multiple transmission configuration indicator (multi-TCI) state transmission comprises determining a disjoint resource split of a set of resource blocks (RBs) for the multi-TCI state transmission, the determination based on a pseudo-random sequence; and transmitting the multi-TCI state transmission to a user equipment (UE) on a subset of the RBs based on the determination.

In a twentieth aspect, alone or in combination with the nineteenth aspect, the pseudo-random sequence is based on an identifier of the UE.

In a twenty-first aspect, alone or in combination with one or more of the nineteenth or twentieth aspects, the identifier of the UE comprises a radio network temporary identifier (RNTI) of the UE or a separate ID of the UE configured by higher layers.

In a twenty-second aspect, alone or in combination with one or more of the nineteenth through twenty-first aspects, the pseudo-random sequence is based on an identifier of one or more of the TCI states involved in the multi-TCI state transmission.

In a twenty-third aspect, alone or in combination with one or more of the nineteenth through twenty-second aspects, the identifier is a physical cell identifier (PCI) of the one or more TCI states.

In a twenty-fourth aspect, alone or in combination with one or more of the nineteenth through twenty-third aspects, the pseudo-random sequence is based on a slot number or an RB index number.

In a twenty-fifth aspect, alone or in combination with one or more of the nineteenth through twenty-fourth aspects, the RB index number is the index of the first RB of scheduled RBs in an active bandwidth part (BWP).

In a twenty-sixth aspect, alone or in combination with one or more of the nineteenth through twenty-fifth aspects, determining the resource split based on the pseudo-random sequence comprises determining one combination from a configured restricted subset of the set of total possible combinations.

In a twenty-seventh aspect, alone or in combination with one or more of the nineteenth through twenty-sixth aspects, the restricted subset includes only combinations of at least semi-distributed RBs.

In a twenty-eighth aspect, alone or in combination with one or more of the nineteenth through twenty-seventh aspects, the determination of the ratio of resources for the resource split is deterministic or non-deterministic.

The techniques described herein may be used for various wireless communication technologies, such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (SGTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2).

The UEs 120 (e.g., 120x, 120y, etc.) may be dispersed throughout the wireless communication network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in FIG. 11 and FIG. 12.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications by a user equipment (UE), comprising:
   determining a resource split of a set of resource blocks (RBs) for a multiple transmission configuration indicator (multi-TCI) state transmission involving, multiple TCI states, the determination based on a pseudo-random sequence; and
   decoding the multi-TCI state transmission based on the determination.

2. The method of claim 1, wherein decoding the multi-TCI state transmission comprises receiving information bits of a transport block (TB), on a physical downlink shared channel (PDSCH), from the multiple TCI states in a same slot or a same symbol.

3. The method of claim 1, wherein:
   the resource split is determined at an RB level, RB group (RBG) level, or precoding RBG (PRG) level;
   the resource split is equal having a same number of RBs for each of the multiple TCI states or unequal having different numbers of RBs for the TCI states; and
   the RBs for each of the multiple ICI states are contiguous or non-contiguous.

4. The method of claim 1, wherein the determination includes determining a first subset of the RBs for a first TCI state involved in the multi-TCI state transmission and a second subset of the RBs for a second TCI state involved in the multi-TCI state transmission.

5. The method of claim 4, wherein:
   on the first subset of the RBs, the multi-TCI state transmission is received with power boosting by the first TCI state and the second TCI state is muted; and
   on the second subset of the RBs, the multi-TCI state transmission is received with power boosting by the second TCI state and the first TCI state is muted.

6. The method of claim 1, wherein the determination of the resource split is performed per-slot.

7. The method of claim 1, further comprising generating the pseudo-random sequence using a same seed generated based on a same parameter as a seed and parameter used by the multiple TCI states to determine the resource split.

8. The method of claim 1, wherein the pseudo-random sequence is based on an identifier of the UE.

9. The method of claim 8, wherein the identifier of the UE comprises a radio network temporary identifier (RNTI) of the UE or a separate ID of the UE configured by higher layers.

10. The method of claim 1, wherein the pseudo-random sequence is based on an identifier of one or more of the multiple TCI states involved in the multi-TCI state transmission.

11. The method of claim 10, wherein the identifier is a physical cell identifier (PCI) of the one or more multiple TCI states.

12. The method of claim 1, wherein the pseudo-random sequence is based on a slot number or an RB index number.

13. The method of claim 12, wherein the RB index number is an index of a first RB of scheduled RBs in an active bandwidth part (BWP).

14. The method of claim 1, wherein:
   the determination of the resource split based on the pseudo-random sequence comprises determining one combination from a set of total possible combinations of the set of RBs between the multiple TCI states; and
   a number of possible total combinations is based on the number RBs in the set of RBs, the granularity at which the resource split is determined, the number of TCI states involved in the multi-TCI state transmission, and whether the resource split is equal or unequal.

15. The method of claim 14, wherein determining the resource split based on the pseudo-random sequence comprises determining one combination from a restricted subset of the set of total possible combinations.

16. The method of claim 15, wherein the restricted subset includes only combinations of at least semi-distributed RBs.

17. The method of claim 1, wherein the determination of the resource split is deterministic or non-deterministic.

18. The method of claim 1, wherein the multiple TCI states are associated with different transmission reception points (TRPS), different antenna panels of a TRP, different quasi co-coloration parameters, or a combination thereof.

19. A method for wireless communications by a base station (BS) involved in a multiple transmission configuration indicator (multi-TCI) state transmission, comprising:
   determining a resource split of a set of resource blocks (RBs) for the multi-TCI state transmission of multiple TCI states, the determination based on a pseudo-random sequence; and
   transmitting the multi-TCI state transmission to a user equipment WE) on a subset of the RBs based on the determination.

20. The method of claim 19, wherein the pseudo-random sequence is based on an identifier of the UE.

21. The method of claim 20 wherein the identifier of the UE comprises a radio network temporary identifier (RNTI) of the UE or a separate ID of the UE configured by higher layers.

22. The method of claim 19, wherein the pseudo-random sequence is based on an identifier of one or more of the multiple TCI states involved in the multi-TCI state transmission.

23. The method of claim 22, wherein the identifier is a physical cell identifier (PO) of the multiple TCI states.

24. The method of claim 19, wherein the pseudo-random sequence is based on a slot number or an RB index number.

25. The method of claim 24, wherein the RB index number is the index of a first RB of scheduled RBs in an active bandwidth part (BWP).

26. The method of claim 19, wherein determining the resource split based on the pseudo-random sequence comprises determining one combination from a restricted subset of a set of total possible combinations.

27. The method of claim 26, wherein the restricted subset includes only combinations of at least semi-distributed RBs.

28. The method of claim 19, wherein the determination of the resource split is deterministic or non-deterministic.

29. An apparatus for wireless communications, comprising:
- means for determining a resource split of a set of resource blocks (RBs) for a multiple transmission configuration indicator (multi-TCI) state transmission of multiple TCI states, the determination based on a pseudo-random sequence; and
- means for decoding the multi-TCI state transmission based on the determination.

30. An apparatus for wireless communications, comprising:
- means for determining a resource split of a set of resource blocks (RBs) for a multiple transmission configuration indicator (multi-TCI) state transmission of multiple TCI states, the determination based on a pseudo-random sequence; and
- means for transmitting the multi-TCI state transmission to a user equipment (UE) on a subset of the RBs based on the determination.

* * * * *